United States Patent
Ovadia et al.

(10) Patent No.: US 9,690,681 B1
(45) Date of Patent: Jun. 27, 2017

(54) METHOD AND SYSTEM FOR AUTOMATICALLY GENERATING EXECUTABLE SYSTEM-LEVEL TESTS

(71) Applicant: CADENCE DESIGN SYSTEMS, INC., San Jose, CA (US)

(72) Inventors: Meir Ovadia, Rosh Ha-ayin (IL); Erez Singer, Givatayim (IL); Efrat Gavish, Tel-Aviv (IL)

(73) Assignee: Cadence Design Systems, Inc., San Jose, CA (US)

( * ) Notice: Subject to any disclaimer, the term of this patent is extended or adjusted under 35 U.S.C. 154(b) by 71 days.

(21) Appl. No.: 14/844,529

(22) Filed: Sep. 3, 2015

(51) Int. Cl.
G06F 11/00 (2006.01)
G06F 11/27 (2006.01)
G06F 12/02 (2006.01)

(52) U.S. Cl.
CPC ............ G06F 11/27 (2013.01); G06F 12/023 (2013.01)

(58) Field of Classification Search
USPC .......................................................... 714/33
See application file for complete search history.

(56) References Cited

U.S. PATENT DOCUMENTS

| | | | | |
|---|---|---|---|---|
| 2002/0181457 A1* | 12/2002 | Mezeul | ................... | H04L 45/00 370/389 |
| 2006/0190871 A1 | 8/2006 | Likovich, Jr. et al. | | |
| 2007/0033552 A1 | 2/2007 | Li | | |
| 2010/0095255 A1 | 4/2010 | Thompson et al. | | |
| 2010/0130138 A1* | 5/2010 | Nandagopalan | .... | H04W 72/048 455/69 |
| 2011/0154110 A1* | 6/2011 | Letz | ..................... | G06F 17/5022 714/33 |
| 2012/0036396 A1* | 2/2012 | Taylor | ..................... | G06F 11/27 714/36 |
| 2013/0326274 A1* | 12/2013 | Olgaard | .............. | G06F 11/2733 714/32 |
| 2014/0298082 A1* | 10/2014 | Rikitake | ............. | G06F 11/2007 714/4.11 |
| 2016/0063119 A1* | 3/2016 | Tevnan | ............. | G06F 17/30867 717/130 |

OTHER PUBLICATIONS

Office Action for U.S. Appl. No. 14/462,852 dated Aug. 2, 2016.

* cited by examiner

*Primary Examiner* — Sarai Butler
(74) *Attorney, Agent, or Firm* — Pearl Cohen Zedek Latzer Baratz LLP (57) ABSTRACT

A method for automatically generating executable system-level tests may include receiving scenario information for testing a device under test (DUT). The method may also include analyzing the scenario information to determine whether there is a legal order in which some or all actions included in the test are to be executed by a plurality of processors of the DUT requiring that one or a plurality of the actions be performed before one or a plurality of other actions may be performed; and identify necessary communications between the processors relating to synchronization points between them. The method may further include automatically generating a test that includes a plurality of actions performed by some or all of the processors in compliance with the legal order.

17 Claims, 5 Drawing Sheets

METHOD AND SYSTEM FOR AUTOMATICALLY GENERATING EXECUTABLE SYSTEM-LEVEL TESTS

FIELD OF THE DISCLOSURE

The present disclosure relates to system testing. More specifically, the present invention relates to method and system for automatically generating executable system-level tests.

BACKGROUND

Design verification is a common process for testing an integrated circuit, board, or system-level architecture, to confirm that it complies with the requirements defined by the specification of the architecture for that device. Design verification for a device under test (DUT) may be performed on the actual device, or on simulated on a simulation model of the device.

Testing a design using a simulation model of the device involves using hardware description languages (HDL) such as Verilog and VHDL. These languages are designed to describe hardware at high levels of abstraction. The generated simulated model of the tested device can receive input stimuli in the form of test vectors, which are a string of binary values applied to the input of a circuit. The simulated model then produces results, which are checked against the expected results for the particular design of the device.

System level test generation typically entails representation of large abstract data models with complex set of rules. Automating the process of creating such data models is often prohibitively expensive in terms of time and computing power. Furthermore, performing the simulated test on the simulation model with numerous test vectors may consume enormous amounts of time and computing power.

SUMMARY

There is thus provided, according to some embodiments of the present invention, a method for automatically generating executable system-level tests. The method may include receiving scenario information for testing a device under test (DUT). The method may also include analyzing the scenario information to determine whether there is a legal order in which some or all actions included in the test are to be executed by a plurality of processors of the DUT requiring that one or a plurality of said actions be performed before one or a plurality of other of said actions may be performed; and to identify necessary communications between the plurality of processors relating to synchronization points between them. The method may further include automatically generating a test that includes a plurality of actions of said one or a plurality of actions performed by some or all of the plurality of processors in compliance with the legal order.

In some embodiments of the present invention, the scenario information comprises a list of actions the user wishes to include in the test; a list of processors and actions from said one or a plurality of actions that these processors are configured to execute; inputs required by each processor for each action it may execute; outputs of each of said processors pertaining to each action of said one or a plurality of actions that processor may execute; and assignment of a communication protocol for communications between one or a plurality of pairs of said processors.

In some embodiments of the present invention, the communication protocol assigned for communications between a first processor of said one or a plurality of pairs of processors and a second processor of said one or a plurality of pairs of processors may be different from a communication protocol assigned for communications between the second processor and the first processor.

The communication protocol may include an address in memory and a size for mail boxes for the allotted memory.

The method may further include adding to the generated test code to write to the allotted memory a unique identifier associated with a preceding action of said one or a plurality of actions after that action was executed.

In some embodiments the method may further include adding to the generated test code to read from the allotted memory the unique identifier associated with the preceding action before a latter action of said one or a plurality of actions is to be executed.

According to some embodiments the method may further include, based on the analysis for determining whether there is a legal order and identifying the necessary communications, determining a minimal number of mail boxes for the allotted memory that are required for facilitating communications between one pair or a plurality of pairs of said plurality of processors, that would allow completing executing of all of the actions

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

DETAILED DESCRIPTION OF EMBODIMENTS OF THE INVENTION

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

Design IP (Intellectual Property) cores in the Field-Programmable Gate Array (FPGA) world, as well as in general, are characterized by a set of design attributes, or parameters, which affect the way the design behaves. For example: if the design IP is that of a RAM, then the WRITE_MODE could determine how data is stored in the RAM, and whether or not the data output of the RAM reflects the input data.

In order to validly verify a device under test (DUT), it is generally desired to test the DUT with combinations of parameter values, sometimes exhaustively. For example, typically, all major design modes are tested with all possible data-width values.

When using Open Verification Methodology (OVM) or Universal Methodology Verification (UVM) environments, these environments themselves may often become parameterized as well. For example—if the data bus width of the DUT is varying, it will cause the DUT interface to become parameterized, and hence the monitor, driver and other such components may become parameterized as well.

The simple solution to providing high quality IP in the verification challenge of a DUT would be to create an exhaustive set of permutations for all parameters, and fully verify the DUT with each permutation. However, doing so has its disadvantages. Using an exhaustive set of permutations for all parameters, and fully verifying the DUT with each permutation is not scalable. E.g., for a DUT with 20-30 parameters, each having 2 to 10 values, the exhaustive permutation set could reach hundreds of thousands permutations, or even more.

Furthermore doing so is likely to involve extensive simulation time that poses a heavy burden on available computing resources. Moreover, covering all permutations for more complex designs may not be feasible at all.

Typically, system designers, software engineers, and functional verification engineers have had to go to great lengths to individually code executable system-level tests to run use-cases on a System on Chip (or SOC). These engineers and designers would need to be intimately familiar with the individual layout, components, elements, and various Intellectual Property (IP) interconnected within the SOC. The same, very valuable designers, would need to individually tailor the code for optimization and execution on a particular system, written specifically for a particular SOC, and manually account for conditions and various types of constraints on the SOC or device. However, such menial test generation by system design engineers is so time consuming, difficult, and expensive as to be impractical.

The mainstream approach in testing systems on chip (SoCs) is to exercise system-level use-cases via the programmer-view using software (SW) driven tests. These tests are typically manually written (e.g., in C) either targeting bare-metal (hardware without an operating system (OS)) or on top of some form of production software stack (SS), and require fast platforms such as FPGA prototyping, emulation, or actual silicon. The tedious manual approach, the quest for quality test content, and the lack of a coverage driven flow are of great concern for advanced multi-core SOC providers.

At the sub-system and system integration levels, hardware (HW) verification engineers deal with hardware and software interdependencies and need to adjust as well. They are interested in exploring the subset of SoC use cases that can run on Register-Transfer Level (RTL) simulation and acceleration platforms. Coverage driven random approach that is useful for IP level typically does not serve system-level use cases well because it focuses on verifying all possible combinations, and makes high-level directed test logic coding error prone.

Finally, the cost of porting use cases across teams and platforms (from virtual to RTL simulation to acceleration/emulation to FPGA prototype to post-silicon etc.) is becoming untenable for chip-makers thereby creating a commercial demand for a solution that allows complex use-case creation and reuse across teams, and allows for tests to execute on all platforms. Portability across platforms not only improves quality, and saves development time, it also allows more efficient debugging by offering the flexibility to move a failing test found running on a fast platform with limited visibility to a different platform with more visibility.

The term 'system-level use-cases' in the context of the present specification is to be taken in a broad sense to include application-like flows and datapaths, stress tests of interconnect fabrics and memories, exercising system-level protocols such as cache and IO coherency, security, memory virtualization, low-power management etc. Although very different in nature, there is in fact commonality in the implementation of these system-level use-cases.

For example, consider the following test implementation challenges:

a) coming up with consistent configuration of multiple IPs and resource allocation (legal pad settings, DMA channel allocations, interrupt lines, video pipes, etc.);

b) scheduling and synchronizing concurrent activity (on multiple HW devices using a single embedded core; across multiple embedded cores; between embedded cores, testbench transactors, and host executed logic;

c) handling crosscutting activity on the very same cores, such as power-down or reset events during memory or cache data flow operations;

d) covering complex state-spaces like coherency protocol state-machine or multi-domain low-power specifications;

e) creating and coordinating multiple test artifacts (other than the embedded code) such as bus functional model (BFM) commands, expected data files, and compilation/run script.

Most if not all of these challenges come into play in the implementation of the different kinds of system-level use-cases mentioned. On top of these, test implementation is aimed at addressing other concerns, such as multiple platforms, adequate checking strategy, debug, maintenance, and coverage (e.g., functional coverage) for completion measurement.

In terms of test creation, users can write a single-thread program, and even come-up with automation (e.g., Perl automation) around it. Talented programmers can perhaps write use-cases involving two or more cores, while carefully orchestrating system states, synchronization points, and latencies throughout the run. But scaling may practically be impossible. It may not scale with complexity of the required scenarios, being longer, and involving more cores, more sophisticated IPs, more power domains. It may not scale to the amount of different parameter variations that are to be tested for each use-case. And it may not be maintained and adapted through the changes of underlying designs and SW APIs, as well as the differences in execution platforms.

To fully address SoC-level verification, a solution should preferably allow for vertical (IP to SoC) reuse. For example, vertical reuse of use-cases may relate to IP, sub-system, SoC (hardware or software), bare-metal software, operating system/s and drivers, middleware (graphics, audio, etc.).

Such solution should preferably also allow for horizontal (cross-platform) reuse by different verification experts, such as, for example, architect, hardware developer, software developer, verification engineer, software test engineer, post-silicon validation engineer, etc.

Such solution should preferably also provide a way to capture and share use cases across various platforms, such as, for example, virtual platform, simulation, emulation, FPGA prototype, silicon board, etc. Such reuse should preferably work both ways as sub-system teams wish to leverage full system context and use-cases, and become more productive in their testing.

According to some embodiments of the present invention a use-case based verification tool is provided, that is tailored for software driven verification automation. Such verification tool offers a model-based approach to describe system level actions and resources that can be composed into subsystem and system level abstract use-cases. According to some embodiments of the present invention, a solver of the verification tool analyzes abstract use-cases and finds legal solutions or concrete use-cases that fulfill the goals represented by each of these abstract use-cases.

Hereinafter an example of model development is described, using a composer graphical user interface according to some embodiments of the present invention, to create abstract use cases and finally using the solver to generate concrete legal tests.

A verification tool according to some embodiments of the present invention may include a system verifier that is configured to define models, for example, using an abstract System Level Notation (SLN) language. SLN's special semantics and object oriented nature makes the model code compact and concise. Additionally, SLN may be used to define operations, data-paths, and use-cases of systems in a formal way. SLN uses the following constructs for this purpose:

a) Components—functional units of the system such as hardware IPs, software libraries (e.g., Graphical library), testbench agents and transactors. The components are instantiated in a tree that represents the model infrastructure;

b) Actions—abstract operations or functions of the respective components. For example, the display can perform a "show" operation with various parameters. Actions may include: inputs—prerequisites and pre-conditions that must be satisfied before an action can take place; outputs—results of the action execution; exec block templates—actual code that is used to execute the action (examples could be a SW driver routine to display a video stream or a testbench sequence that is called to send a uart-stream at a certain time). The exec blocks are platform specific. For example, the same send_uart stream can have an exec block for simulation that calls a Universal Verification Methodology (UVM) sequence and another call for emulation where a SW Testbench (TB) routine needs to be called. A Support Vector Regression (SVR) constraint solver uses the inputs and outputs to create legal chains of actions to fulfill the user provided goals. Once a legal scenario is randomized, the exec blocks are used to translate the result into a platform specific test;

c) Tokens—The information that describes the input and the output of actions. For example, a video controller decode action must decode the video stream before it may be displayed. The decoded video stream is a token; that is, it is an output of the video controller (a result of executing the decode action), and it is an input (pre-condition) to the display component "show" action execution. The token can have multiple attributes that represent the specific token instance (for example, a short high-definition video stream). Randomization and constraints are used to allow the verification tool according to some embodiments of the present invention to automatically select values that are both random and legal;

d) Places—"Locations" used for token exchange across actions. "Producer" is an action that outputs a token to a place. "Consumer" action might consume the same (or a different) token by accessing the same (or a different) place. According to some embodiments of the present invention, there are three kinds of places: Memories—tokens can be written and later be read from a memory. These typically correspond to memory blocks, HW buffers, control registers, etc.; Channels—model port connections or same time connectivity in which tokens are sent and received. These typically correspond to point-to-point protocols, interconnect fabrics, and external interfaces; Locks—these assist in managing availability of resources.

As part of the modeling process, the SLN architect may review system block diagram, existing driver routine header-files, and tests to identify the program players in terms of actions, components and tokens. The block diagram, verification plan and C files must be reviewed at the same time to get a complete picture of the needed model. This also helps keeping the model short and focused on the needed abstraction.

According to some embodiments of the present invention, there is disclosed a method of automated generation of system level tests that may be derived from one or a plurality of scenarios.

In a given scenario there are various actions that may be performed on separate processors, by separate operating systems, or by separate clusters. A problem that arises from the separate performers of these actions is how to determine the order in which these actions occur and how to automatically generate a test or tests that comply with that order of actions.

Figure 1:
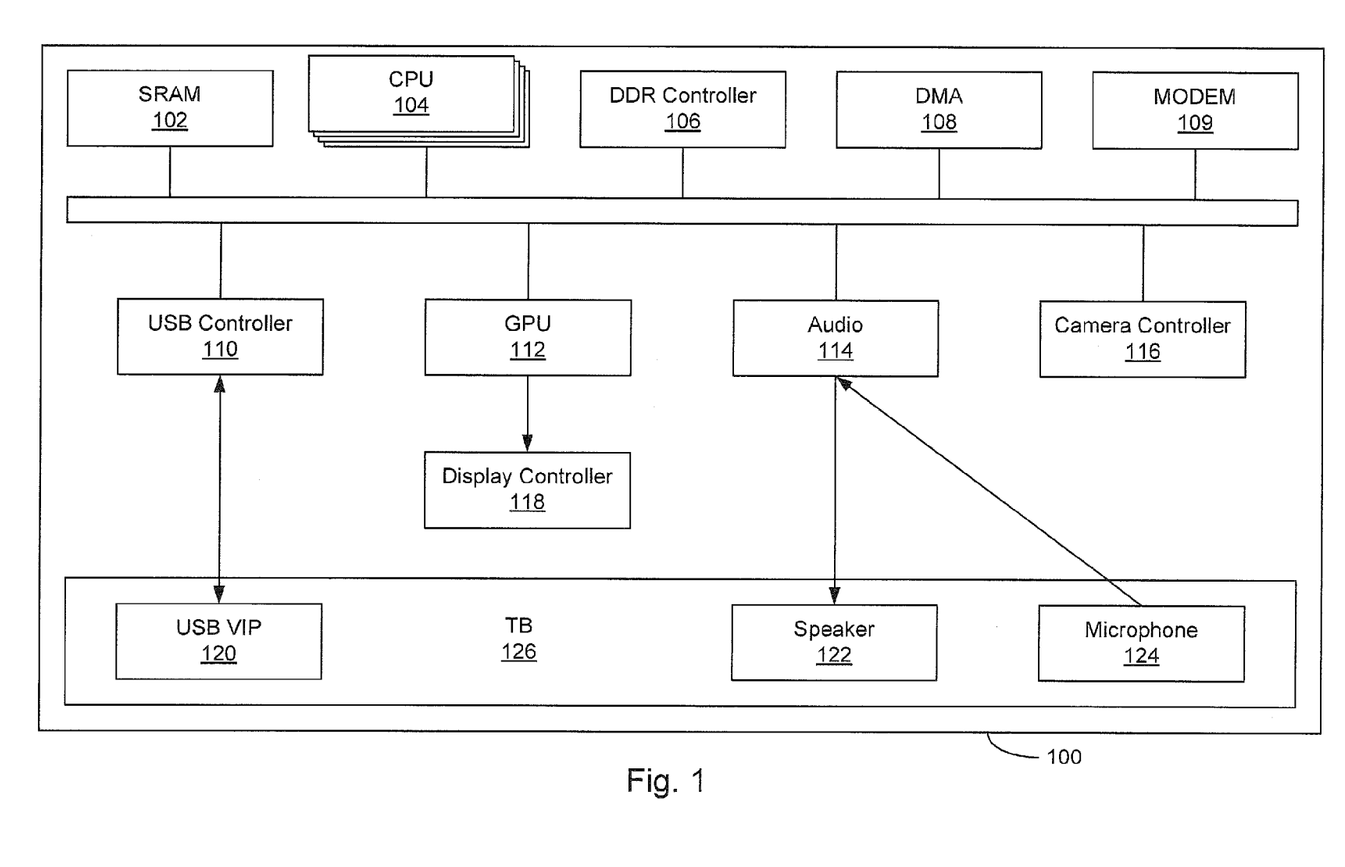
FIG. 1 illustrates a simplified System on Chip (SoC) to be tested.

To illustrate a process according to some embodiments of the present invention, a simplified mobile SoC is now considered, as an example. FIG. 1 illustrates a simplified System on Chip (SoC) 100 to be tested. SoC 100 may include Static Random Access Memory (SRAM) 102, several Central Processing Units (CPUs) 104, Double Data Rate (DDR) controller 106, Direct Memory Access (DMA) 108, Modular Demodulator (MODEM) 109, Universal Serial Bus (USB) controller 110, Graphical Processor Unit (GPU) 112, Audio interface 114, camera controller 116, display controller 118, and testbench (TB) 126, including USB Verification IP (VIP) 120, speaker 122 and microphone 124.

Various components of the SoC are capable of performing various actions. For example, some of these actions may include: a) some or all of the processing units 104 may read from and/or write to SRAM 102; b) the audio component 114 may operate the speaker 122 to play a sound file by reading it from the SRAM 102, and may operate the microphone 124 to capture sounds and save them into a file on SRAM 102. Of course the SoC may be configured to perform many more actions.

A scenario may include a plurality of actions which are performed by a plurality of components, executed on processors. When all actions are executed on a single processor the legal order may be complied with easily. However, when actions are executed on separate processors maintaining the legal order is more complex.

To-date, when actions of a particular scenario are executed on separate processors, and depend on a legal order (e.g., action 1 must be performed before action 2 is performed) programmers or debug experts typically add to the code that activates action 1 a suffix instructing the processor on which action 1 is executed to send a message to the other processor on which the latter action—action 2—is to be executed, that permits action 2 to be executed, and add to the code that activates action 2 a prefix instructing the processor on which action 2 is executed to look for the message that permits action 2 to be executed before executing action 2. As each processor may typically execute various actions, adding such code manually is a tedious and painstaking work.

According to some embodiments of the present invention, a new automated method of implementing a scenario that complies with a given legal order, is provided, examples of which are described hereinafter.

By "legal order" is meant the allowed/possible order in which actions executed by processors on the DUT are to be performed.

Figure 2:
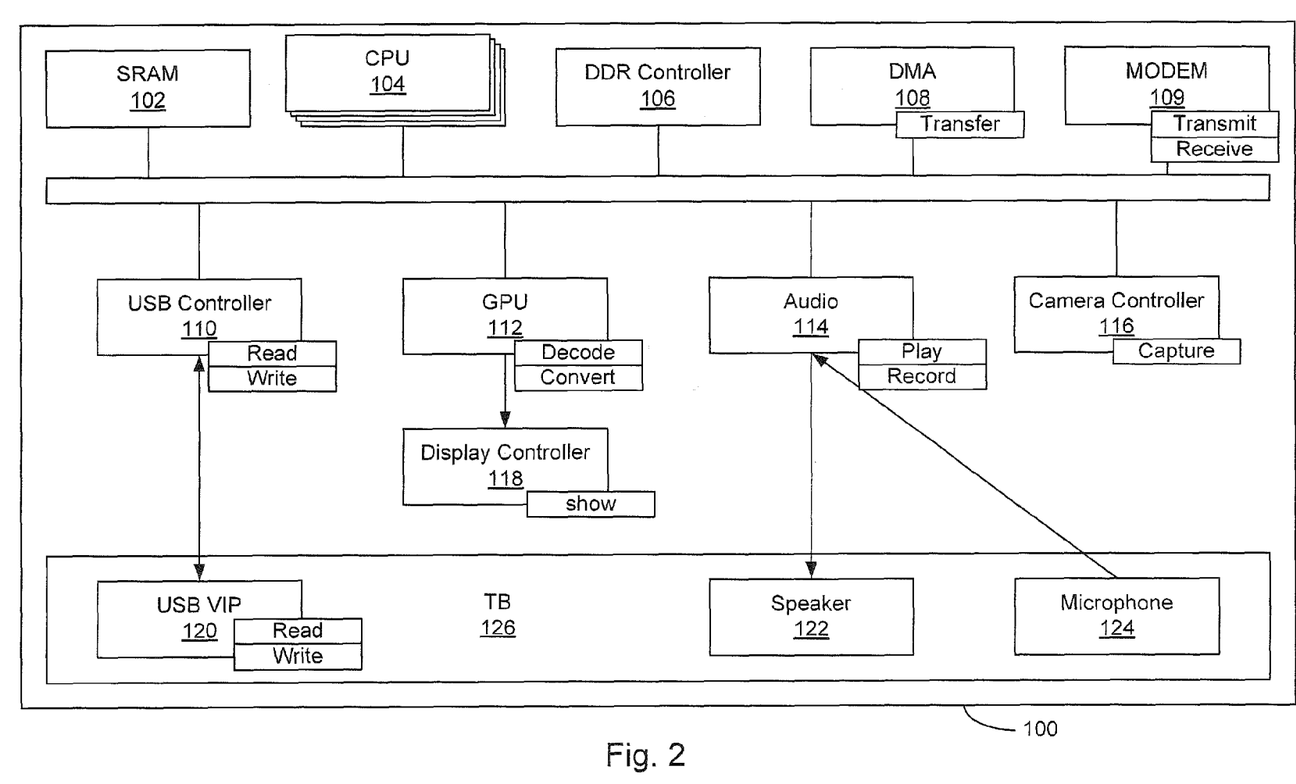
FIG. 2 illustrates a block diagram of a simplified mobile SoC, with user provided system level actions that are required for defining user-cases of interest, according to some embodiments of the present invention.

FIG. 2 illustrates a block diagram of a simplified mobile SoC 100, with user provided system level actions that are required for defining user-cases of interest, according to some embodiments of the present invention. For example, modem 109 may perform "transmit" and "receive", the display controller 118 may perform "show", the graphics processor GPX may perform "decode" to display and "convert" format, to mention just a few of the system actions shown.

Figure 3:
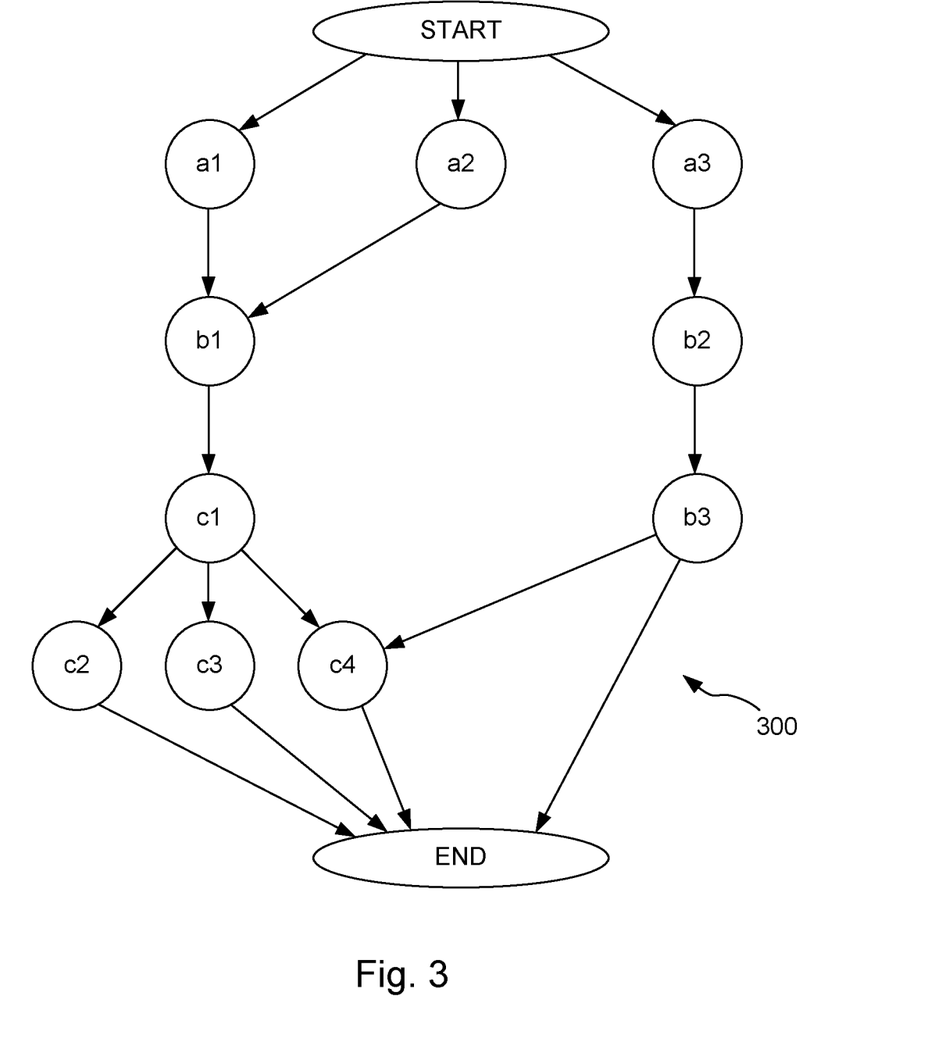
FIG. 3 illustrates a scenario which includes a plurality of actions and their legal order.

FIG. 3 illustrates a simple scenario 300 which includes a plurality of actions and their legal order.

Actions a1, a2, and a3 are actions that may be executed by processor A1. Actions b1, b2 and b3 are actions that may be executed by processor P2. Actions c1, c2, c3 and c4 may be executed by processor P3. Processors P1, P2 and P3 are separate processors.

The scenario may start with any of actions a1, a2 or a3, which may be performed on processor P1. In the depicted scenario, action b1 may be performed only after action a1 and action a2 were performed, action b2 may be performed only after action a3 was performed, action c1 may be performed only after action b1 was performed, action b3 may be performed only after action b2 was performed, actions c2, c3 and c4, may each be performed only after action c1 was performed (in the case of action c4, it may only be performed if both action c1 and b3 were performed. In other, more complex, scenarios, actions may be repeated, when certain preconditions relating to prior performance of preceding actions were fulfilled.

Figure 4:
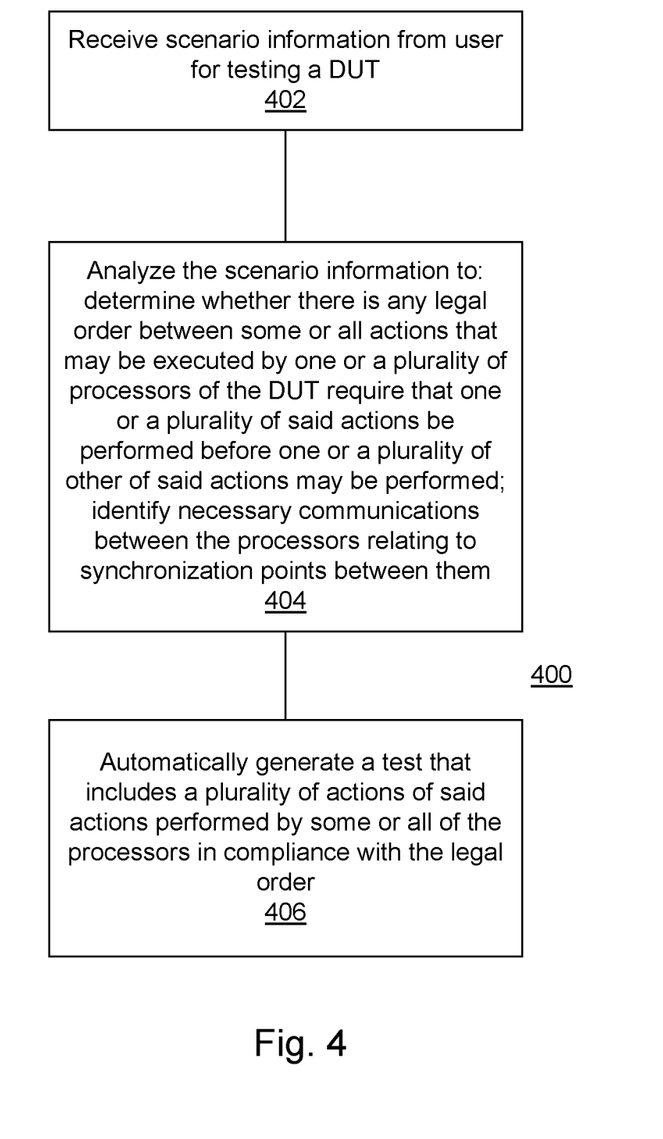
FIG. 4 illustrates a method of automatically generating an executable system-level test for testing a device under test, according to some embodiments of the present invention.

FIG. 4 illustrates a method of automatically generating an executable system-level test for testing a device under test, according to some embodiments of the present invention.

Method 400 includes receiving 402 scenario information, for example, from a user (or from other source), for testing a device under test (DUT).

Method 400 also includes analyzing 404 the scenario information to: determine whether there is a legal order in which some or all actions are to be executed by one or a plurality of processors of the DUT requiring that one or a plurality of said actions be performed before one or a plurality of other of said actions may be performed; and identify necessary communications between the processors relating to synchronization points between them.

Method 400 may further include automatically generating 406 a test that includes a plurality of actions of said one or a plurality of actions performed by some or all of the processors in compliance with the legal order.

According to some embodiments of the present invention, the scenario information, which may be input by the user via an input device, comprises:

a) a list of actions the user wishes to include in the test;

b) a list of processors and actions from the list of actions that they are configured to execute;

c) the inputs required by each processor for each action it may execute;

d) the outputs of each processor pertaining to each action it may execute; and e) assignment of a communication protocol for communications between the processors.

The inputs required by a processor to perform a specific action may vary. For example, an input for a camera may be a signal to turn the camera on, a signal to capture an image; an input for a display controller may be an incoming video stream; and input for a speaker may be an incoming sound file, etc.

Similarly an output of a camera may be a generated image, and output of a speaker may be playing of a sound.

The communication protocol does not necessarily have to be the same in bi-directional communications, e.g., the communication protocol assigned for communications transmitted from processor P1 and received by processor P2 does not necessarily have to be the same as the communication protocol assigned for transmitting communications from processor P2 to processor P1. For example, memory communication protocol typically includes an address in memory indicating the start of a memory allocation for a processor to write into or read from. A communication protocol may also include a size of a mailbox into which a single data item may be written or read from. Other communication protocols (e.g., socket, enet, etc.) may also be used in some embodiments of the present invention.

The test generator, according to some embodiments of the present invention may be part of a verification tool.

According to some embodiments of the present invention, a test generator is configured to analyze the information provided by the user to:

a) identify all actions that may be performed by each of the processors;

b) determine if there is any legal order between all or some of the actions requiring that one or a plurality of actions be performed before one or a plurality of other actions may be performed;

identify necessary communications between the processors (relating to synchronization points between them).

System 600 may include a processing unit 602 (e.g., one or a plurality of processors, on a single machine or distributed on a plurality of machines) for executing a method according to some embodiments of the present invention.

Figure 5:
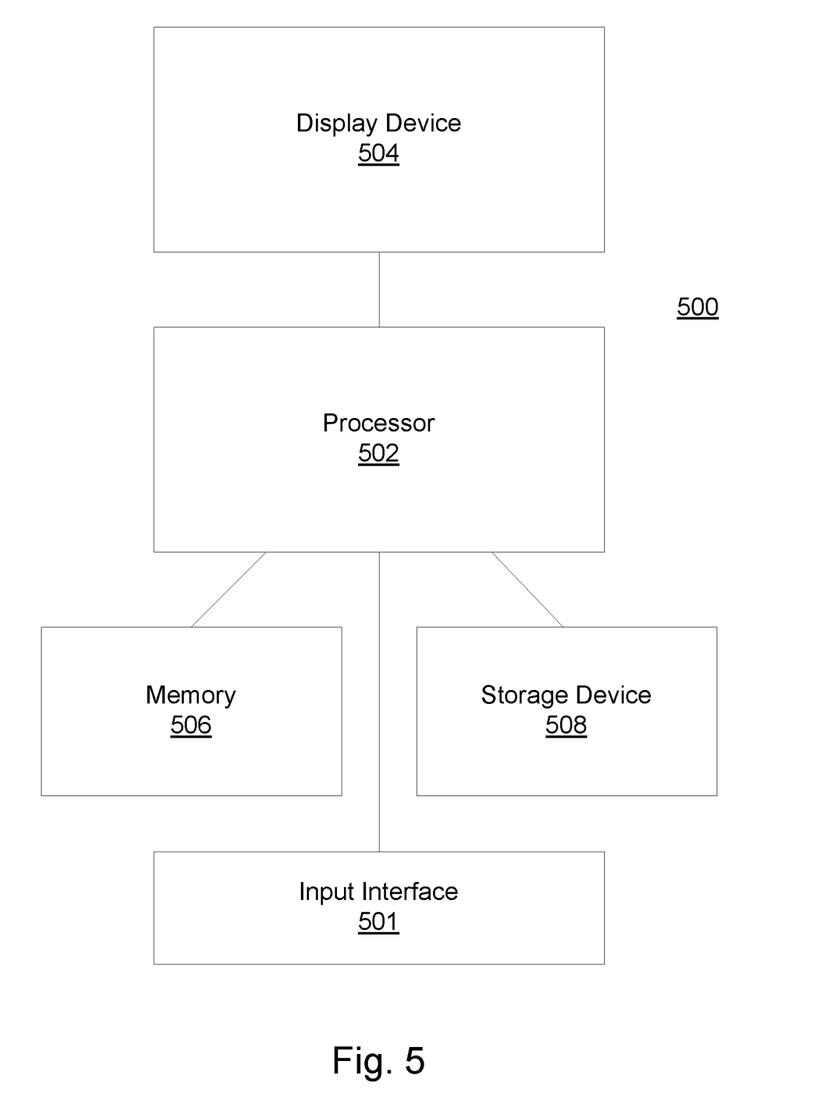
FIG. 5 illustrates a system for automatically generating executable system-level tests according to some embodiments of the present invention.

FIG. 5 illustrates a system for automatically generating executable system-level tests according to some embodiments of the present invention.

System 500 may include an input interface 501 for receiving data and instructions from a user, such as, for example, one or a plurality of keyboards, pointing devices, touch sensitive surfaces (e.g. touch sensitive screens), etc. for allowing a user to input commands and data. Processing unit 502 may be linked with memory 506 on which a program implementing a method according to some embodiments of the present invention and corresponding data may be loaded and run from and data may be saved, and storage device 508, which includes a non-transitory computer readable medium (or mediums) such as, for example, one or a plurality of hard disks, flash memory devices, etc. on which a program implementing a method according to some embodiments of the present invention and corresponding data may be stored. System 500 may further include an output device 504 (e.g., display device such as CRT, LCD, LED etc.) on which one or a plurality user interfaces associated with a program implementing a method according to some embodiments and corresponding data may be presented.

In some embodiments of the present invention, a first processor that executes a first action that serves as a preceding action to a latter second action performed by a second processor is configured, in compliance with the communication protocol assigned for communication between these two processors, to write into the allotted memory a unique data identifier (e.g., a unique number) that is indicates that the action was completed. The Second processor that is designed to execute the latter action is configured to check the allotted memory to search for the unique data identifier, and perform the latter action only if the unique identifier indeed exists in the allotted memory.

In some embodiments of the present invention, this may be implemented, for example, as follows: after analyzing the information received from the user, the test generator automatically adds code portions to the code that causes an action to be performed. The added code has two general forms: If this action requires a preceding action to be performed before the present action may be performed, then the additional code, for example in the form of a prefix, is designed to cause the processor that is to perform the present action to check the allotted memory and search for the unique data identifier associated with the preceding action and perform the latter action only if the unique identifier is found in the memory. If the action itself serves as a preceding action to a latter action, then the additional code, for example in the form of a suffix, is designed to cause the processor that is to perform that action, to write into the allotted memory the unique identifier associated with that action. If the latter action also serves as a preceding action for some other latter action then additional code is automatically added by the test generator to the code affecting the latter action, such as, for example, in the form of a suffix, designed to cause the processor that has performed the latter action, to write into the allotted memory the unique identifier associated with that latter action.

Thus, during the course of performing a test that was generated based on the scenario, the allotted memory is written into and read by the processors executing the actions involved in the test.

The unique identifier associated with each action may be, for example, a unique number which each action is assigned.

The allotted memory may include a predetermined number of mail boxes, each designed to hold one unique identifier associated with one action of the list of actions that may be executed in a test based on the given scenario. Initially the values in the mail boxes are reset and each mail box is assigned a number which is not used as a unique identifier for any of the actions involved in the scenario (for example zero).

Thus, for example, if action a1 (see FIG. 3) is assigned a unique identifier which is for example a number, e.g., number 1, and if action a2 is assigned a unique identifier which is, for example number 3, upon completion of execution of these actions two of the mail boxes would be assigned the values of that unique identifiers (one mail box would hold number 1 and another mail box would hold number 2, in this example). Action b1 would be executed by processor P2 only after that processor reads these unique identifiers in the mail boxes of the allotted memory.

According to some embodiments of the present invention, a method for generating an executable system level test for testing a DUT, in which memory use is optimized, is provided.

In order to optimize memory usage, the allotted memory into which processors write or read from, in accordance with some embodiments of the present invention, is designed to occupy the minimal required space, for example in the manner described hereinafter:

When analyzing the scenario information to determine whether there is a legal order between all or some of the actions, and to identify the necessary communications between the processors, the test generator determines the minimal number of mail boxes that are required for facilitating communications between one pair or a plurality of pairs of processors, that would allow completing executing of all of the actions. For example, if a certain action is only performed once and serves as a preceding action for a latter action, then when these two actions are completed, the mail boxes used to hold the unique identifier for that action may be cleared and used for holding a unique identifier of another action that is to be performed at a later stage during the execution of the test. Thus that mail box is efficiently and sparingly used, allowing allocating a minimal number of mail boxes for the selected communication protocol between the two relevant processors.

FIG. 5 illustrates a system 500 for automatically generating executable system-level tests according to some embodiments of the present invention. System 500 may include a processor 502 (e.g. one or a plurality of processors, on a single machine or distributed on a plurality of machines) for executing a method according to some embodiments of the present invention.

Processor 502 may be linked with memory 506 on which a program implementing a method according to some embodiments of the present invention and corresponding data may be loaded and run from, and storage device 508, which includes a non-transitory computer readable medium (or mediums) such as, for example, one or a plurality of hard disks, flash memory devices, etc. on which a program implementing a method according to some embodiments of the present invention and corresponding data may be stored. System 400 may further include an output device 504 (e.g. display device such as CRT, LCD, LED etc.) on which one or a plurality user interfaces associated with a program implementing a method according to some embodiments and corresponding data may be presented. System 500 may also include input interface 501, such as, for example, one or a plurality of keyboards, pointing devices, touch sensitive surfaces (e.g. touch sensitive screens), etc. for allowing a user to input commands and data.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. A method, comprising:
    receiving scenario information for testing a device under test (DUT);
    analyzing the scenario information to:
        determine whether there is a legal order in which some or all actions to be executed by a plurality of processors of the DUT requiring that one or a plurality of said actions be performed before one or a plurality of other of said actions may be performed; identify necessary communications between the plurality of processors relating to synchronization points between the plurality of processors of the DUT, and determine a minimal number of mail boxes for facilitating the communication between one or more pairs of processors from said plurality of processors; and
    automatically generating a test by allocating the minimum number of mail boxes between the one or more pairs of processors from said plurality of processors, wherein the generated test includes a plurality of actions of said one or a plurality of actions performed by some or all of the plurality of processors in compliance with the legal order.

2. The method of claim 1, wherein the scenario information comprises a list of actions the user wishes to include in the test; a list of processors and actions from said one or a plurality of actions that these processors are configured to execute; inputs required by each processor for each action it may execute; outputs of each of said processors pertaining to each action of said one or a plurality of actions that processor may execute; and assignment of a communication protocol for communications between one or a plurality of pairs of said processors.

3. The method of claim 2, wherein the communication protocol assigned for communications between a first processor of said one or a plurality of pairs of processors and a second processor of said one or a plurality of pairs of processors is different from a communication protocol assigned for communications between the second processor and the first processor.

4. The method of claim 2, wherein the communication protocol comprises an address in memory and a size for mail boxes for the allotted memory.

5. The method of claim 1, further comprising adding to the generated test code to write to the allotted memory a unique identifier associated with a preceding action of said one or a plurality of actions after that action was executed.

6. The method of claim 5, further comprising adding to the generated test code to read from the allotted memory the unique identifier associated with the preceding action before a latter action of said one or a plurality of actions is to be executed.

7. A non-transitory computer readable storage medium having stored thereon instructions that when executed by a processor will cause the processor to:
    receive scenario information for testing a device under test (DUT);
    analyze the scenario information to:
        determine whether there is a legal order in which some or all actions to be executed by a plurality of processors of the DUT requiring that one or a plurality of said actions be performed before one or a plurality of other of said actions may be performed; and identify necessary communications between the plurality of processors relating to synchronization points between the plurality of processors of the DUT, and determine a minimal number of mail boxes for facilitating the communication between one or more pairs of processors from said plurality of processors; and
    automatically generate a test by allocating the minimum number of mail boxes between the one or more pairs of processors from said plurality of processors, wherein the generated test includes a plurality of actions of said one or a plurality of actions performed by some or all of the plurality of processors in compliance with the legal order.

8. The non-transitory computer readable storage medium of claim 7, wherein the scenario information comprises a list of actions the user wishes to include in the test; a list of processors and actions from said one or a plurality of actions that these processors are configured to execute; inputs required by each processor for each action it may execute; outputs of each of said processors pertaining to each action of said one or a plurality of actions that processor may execute; and assignment of a communication protocol for communications between one or a plurality of pairs of said processors.

9. The non-transitory computer readable storage medium of claim 8, wherein the communication protocol comprises an address in memory and a size for mail boxes for the allotted memory.

10. The non-transitory computer readable storage medium of claim 7, further comprising adding to the generated test code to write to the allotted memory a unique identifier associated with a preceding action of said one or a plurality of actions after that action was executed.

11. The non-transitory computer readable storage medium of claim 10, having stored thereon instructions that when executed by a processor will cause the processor to further add to the generated test code to read from the allotted memory the unique identifier associated with the preceding action before a latter action of said one or a plurality of actions is to be executed.

12. A system, comprising:
a memory and
a processor configured to:
  receive scenario information for testing a device under test (DUT);
  analyze the scenario information to:
    determine whether there is a legal order in which some or all actions to be executed by a plurality of processors of the DUT requiring that one or a plurality of said actions be performed before one or a plurality of other of said actions may be performed; and
    identify necessary communications between the plurality of processors relating to synchronization points between the plurality of processors of the DUT, and determine a minimal number of mail boxes for facilitating the communication between one or more pairs of processors from said plurality of processors; and
  automatically generate a test by allocating the minimum number of mail boxes between the one or more pairs of processors from said plurality of processors, wherein the generated test includes a plurality of actions of said one or a plurality of actions performed by some or all of the plurality of processors in compliance with the legal order.

13. The system of claim 12, wherein the scenario information comprises a list of actions the user wishes to include in the test; a list of processors and actions from said one or a plurality of actions that these processors are configured to execute; inputs required by each processor for each action it may execute; outputs of each of said processors pertaining to each action of said one or a plurality of actions that processor may execute; and assignment of a communication protocol for communications between one or a plurality of pairs of said processors.

14. The system of claim 13, wherein the communication protocol assigned for communications between a first processor of said one or a plurality of pairs of processors and a second processor of said one or a plurality of pairs of processors is different from a communication protocol assigned for communications between the second processor and the first processor.

15. The system of claim 14, wherein the communication protocol comprises an address in memory and a size for mail boxes for the allotted memory.

16. The system of claim 12, further comprising adding to the generated test code to write to the allotted memory a unique identifier associated with a preceding action of said one or a plurality of actions after that action was executed.

17. The system of claim 16, further comprising adding to the generated test code to read from the allotted memory the unique identifier associated with the preceding action before a latter action of said one or a plurality of actions is to be executed.

* * * * *